(12) United States Patent
Kawamoto et al.

(10) Patent No.: US 9,969,033 B2
(45) Date of Patent: May 15, 2018

(54) NI-BASE ALLOY WELD METAL AND NI-BASE ALLOY COVERED ELECTRODE

(75) Inventors: Hiroaki Kawamoto, Fujisawa (JP); Hirohisa Watanabe, Fujisawa (JP); Tetsunao Ikeda, Fujisawa (JP); Yushi Sawada, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 648 days.

(21) Appl. No.: 13/520,583

(22) PCT Filed: Nov. 4, 2011

(86) PCT No.: PCT/JP2011/075431
§ 371 (c)(1),
(2), (4) Date: Jul. 5, 2012

(87) PCT Pub. No.: WO2012/073646
PCT Pub. Date: Jun. 7, 2012

(65) Prior Publication Data
US 2012/0276384 A1    Nov. 1, 2012

(30) Foreign Application Priority Data
Dec. 2, 2010    (JP) .................................. 2010-269775

(51) Int. Cl.
*B32B 15/00* (2006.01)
*B23K 35/30* (2006.01)
(Continued)

(52) U.S. Cl.
CPC ...... *B23K 35/3033* (2013.01); *B23K 35/0261* (2013.01); *C22C 19/053* (2013.01); *C22C 19/055* (2013.01); *Y10T 428/2951* (2015.01)

(58) Field of Classification Search
CPC ............ B23K 35/0261; B23K 35/3033; Y10T 428/2951
(Continued)

(56) References Cited

U.S. PATENT DOCUMENTS 4,135,919 A * 1/1979 Culling ......................... 420/582
5,430,269 A * 7/1995 Natsume et al. ............... 219/73
(Continued)

FOREIGN PATENT DOCUMENTS

CN  1827287 A    9/2006
EP  1 710 041 A1  10/2006
(Continued)

OTHER PUBLICATIONS

U.S. Appl. No. 13/838,703, filed Mar. 15, 2013, Kawamoto, et al.
Office Action dated Jun. 11, 2013 in the corresponding Japanese Patent Application No. 2010-269775 (with English Translation).

*Primary Examiner* — Peter Y Choi
(74) *Attorney, Agent, or Firm* — Oblon, McClelland, Maier & Neustadt, L.L.P.

(57) ABSTRACT

The contents of Cr, Fe, Mn, Ti, Si, Cu, N, Al, C, Mg, Mo, B, Zr, and Nb+Ta in a Ni-base alloy weld metal are properly specified and the contents of Co, P, and S in incidental impurities are controlled. In particular, a weld metal having high cracking resistance is formed by specifying the Mn content in a proper range and restricting the contents of B and Zr at low levels. Regarding a Ni-base alloy covered electrode, by specifying the contents of a slag-forming agent, a metal fluoride, and a carbonate serving as flux components in proper ranges and controlling the contents of Mn, Nb+Ta, and Fe in a flux, good welding workability is achieved and a weld metal having good bead appearance is formed.

5 Claims, 1 Drawing Sheet

(51) Int. Cl.
*B23K 35/02* (2006.01)
*C22C 19/05* (2006.01)

(58) Field of Classification Search
USPC .......................................................... 420/448
See application file for complete search history.

(56) References Cited

U.S. PATENT DOCUMENTS

2006/0196919 A1* 9/2006 James et al. .................. 228/223
2007/0272671 A1* 11/2007 Nakajima et al. ....... 219/146.22
2009/0321404 A1 12/2009 Keegan
2010/0308028 A1* 12/2010 Gerth et al. ............... 219/145.1

FOREIGN PATENT DOCUMENTS

| JP | 8 174270 | 7/1996 |
| JP | 11 347790 | 12/1999 |
| JP | 2001 107196 | 4/2001 |
| JP | 2003 311473 | 11/2003 |
| JP | 2008 528806 | 7/2008 |
| JP | 2009 22989 | 2/2009 |
| WO | 2005 070612 | 8/2008 |

* cited by examiner

NI-BASE ALLOY WELD METAL AND NI-BASE ALLOY COVERED ELECTRODE

TECHNICAL FIELD

The present invention relates to a Ni-base alloy weld metal that is suitable for welding of nuclear reactors, pressure vessels, or the like and a Ni-base alloy covered electrode used to form the Ni-base alloy weld metal. In particular, the present invention relates to a Ni-base alloy weld metal having high cracking resistance and good bead appearance and a Ni-base alloy covered electrode that is used to form the Ni-base alloy weld metal and achieves good welding workability.

BACKGROUND ART

Ni-15Cr alloys having high resistance to stress corrosion cracking in high-temperature and high-pressure water have been conventionally used as materials of a high-temperature and high-pressure vessel typically used in a pressurized water nuclear power plant. However, in order to further improve the resistance to stress corrosion cracking, Ni-base high Cr alloys such as Ni-30Cr alloys have been employed in recent years. In welding of the high-pressure vessel, since the same corrosion resistance as that of a base metal is required, a filler metal containing the same components as those of the base metal is needed.

However, when overlay welding or joint welding is performed using a Ni-30Cr filler metal, micro cracking is easily caused in weld metal stacked through multi-pass welding. This grain boundary cracking is called "ductility-dip cracking of the reheated weld metal", which is distinguished from solidification cracking caused when a weld metal is solidified, and occurs in a temperature range in which the solidification is completed. The ductility-dip cracking of the reheated weld metal is described below. When a weld metal composed of a high-Cr-content Ni-base alloy containing about 300 or more of Cr is repeatedly subjected to reheating during welding, a coarse Cr carbide is precipitated in a grain boundary and the grain boundary strength, that is, the bonding strength between grains adjacent to each other is decreased. Consequently, if a tensile thermal stress or shearing thermal stress is exerted on the grain boundary during welding, the grain boundary is opened.

In PTL 1, Mn and Nb are added to prevent the ductility-dip cracking of the reheated weld metal. PTL 1 discloses a Ni—Cr—Fe alloy weld metal containing Cr: 27 to 31% by mass, Fe: 6 to 11% by mass, C: 0.01 to 0.04% by mass, Mn: 1.5 to 4.0% by mass, Nb: 1 to 3% by mass, Ta: 3% or less by mass, Nb+Ta: 1 to 3% by mass, Ti: 0.01 to 0.50% by mass, Zr: 0.0003 to 0.02% by mass, B: 0.0005 to 0.004% by mass, Si: less than 0.50% by mass, Al: up to 0.50% by mass, Cu: less than 0.50% by mass, W: less than 1.0% by mass, Mo: less than 1.0% by mass, Co: less than 0.12% by mass, S: less than 0.015% by mass, P: 0.015% or less by mass, and Mg: 0.004 to 0.01% by mass, the balance being Ni and incidental impurities.

PTL 2 discloses an austenite-based weld joint and welding material used for high-temperature equipment such as a boiler and a technology of ensuring corrosion resistance by adding 1 to 5% by mass of Cu. In the technology of PTL 2, the content of Mn added as a deoxidizer is set to be 3.0% or less by mass relative to the total mass of the weld joint or welding material, whereby the formation of an intermetallic compound when the weld joint or welding material is used at high temperature for a long time is suppressed and thus the embrittlement is prevented.

In PTL 3, the contents of Si, Mn, Cu, Nb, W, V, and the like added to a covered electrode are specified to form a weld metal having high weld cracking resistance. PTL 3 also discloses that a nitride such as TiN is produced by actively adding N (0.03 to 0.3% by mass) as an incidental impurity to improve the tensile strength of a weld metal.

CITATION LIST

Patent Literature

PTL 1: Japanese Unexamined Patent Application Publication (Translation of PCT Application) No. 2008-528806
PTL 2: Japanese Unexamined Patent Application Publication No. 2001-107196
PTL 3: Japanese Unexamined Patent Application Publication No. 8-174270

SUMMARY OF INVENTION

Technical Problem

However, the weld metal disclosed in PTL 1 contains a large amount of Mg added as a deoxidizer and thus the welding workability such as slag covering property and slag separation is degraded during welding. Furthermore, the weld metal disclosed in PTL 1 contains a small amount of Mn and thus the reheat cracking resistance cannot be sufficiently ensured. If the weld metal disclosed in PTL 1 contains large amounts of B and Zr, the solidification cracking resistance of the weld metal may be degraded.

In general, in the case where welding is performed using a welding material having the same chemical composition as that of a base metal, there are problems in that the corrosion resistance and strength of a weld metal are degraded compared with those of a base metal or the corrosion resistance of a weld joint is not sufficiently achieved in a sulfuric acid environment. Although the corrosion resistance is ensured by adding 1 to 5% by mass of Cu in PTL 2, austenitic steel containing Cu has high weld cracking susceptibility. Therefore, in addition to solidification cracking, extremely small micro cracking is caused in a weld metal when multi-layer overlay welding is performed, and a sound weld joint is not obtained. The weld joint and welding material disclosed in PTL 2 also contain a small amount of Mn as in PTL 1, and thus the reheat cracking resistance cannot be sufficiently ensured.

The technologies of PTLs 1 and 2 are believed to be technologies that include a covered electrode as a welding material. However, a slag agent or the like used in the case where such technologies are applied to a covered electrode is not sufficiently described. Therefore, depending on the composition of a slag agent, it may be difficult to achieve good welding workability.

In the covered electrode disclosed in PTL 3, N is added to increase the tensile strength of a weld metal. However, the amount of N added is excessively large and thus a large amount of nitride is precipitated at high temperature, which causes the embrittlement of a weld metal. Furthermore, the addition of N in a large amount easily causes weld defects such as blow holes.

In view of the foregoing problems, an object of the present invention is to provide a Ni-base alloy weld metal having high cracking resistance and good bead appearance and a Ni-base alloy covered electrode that is used to form the Ni-base alloy weld metal and achieves good welding workability.

Solution to Problem

A Ni-base alloy weld metal according to the present invention contains, relative to the total mass of the Ni-base alloy weld metal, Cr: 28.0 to 31.5% by mass, Fe: 7.0 to 11.0% by mass, Nb and Ta: 1.0 to 2.0% by mass in total, C: 0.05% or less by mass, Mn: 4.0 to 5.5% by mass, N: 0.005 to 0.08% by mass, Si: 0.70% or less by mass, Mg: 0.0010% or less by mass, Al: 0.50% or less by mass, Ti: 0.50% or less by mass, Mo: 0.50% or less by mass, and Cu: 0.50% or less by mass, the balance being Ni and incidental impurities, wherein contents of B and Zr in the Ni-base alloy weld metal are controlled to be 0.0010% or less by mass and 0.0010% or less by mass, respectively, and contents of Co, P, and S in the incidental impurities are controlled to be 0.10% or less by mass, 0.015% or less by mass, and 0.015% or less by mass, respectively.

A Ni-base alloy covered electrode according to the present invention includes a core wire composed of a Ni-base alloy and a covering material that contains a component of a flux and covers a periphery of the core wire, wherein the core wire contains, relative to the total mass of the core wire, Cr: 28.0 to 31.5% by mass, Fe: 7.0 to 11.0% by mass, Nb and Ta: 1.0 to 2.0% by mass in total, C: 0.05% or less by mass, Mn: 4.0 to 5.5% by mass, N: 0.001 to 0.02% by mass, Si: 0.70% or less by mass, Mg: 0.0010% or less by mass, Al: 0.50% or less by mass, Ti: 0.50% or less by mass, Mo: 0.50% or less by mass, and Cu: 0.50% or less by mass, the balance being Ni and incidental impurities; contents of B and Zr in the core wire are controlled to be 0.0010% or less by mass and 0.0010% or less by mass, respectively; contents of Co, P, and S in the incidental impurities are controlled to be 0.10% or less by mass, 0.015% or less by mass, and 0.015% or less by mass, respectively; the covering material contains, as the component of a flux, a slag-forming agent: 3.5 to 6.5% by mass, a metal fluoride (in terms of F content): 2 to 5% by mass, and a carbonate (in terms of $CO_2$ content): 2.5 to 6.5% by mass relative to the total mass of the covered electrode; a Mn content in the flux is controlled to be 2.0% or less by mass; a total content of Nb and Ta in the flux is controlled to be 1.5% or less by mass; and a Fe content in the flux is controlled to be 2.5% or less by mass. In the present invention, the covering material preferably contains, as the component of a flux, an alkali metal oxide in an amount of 0.7 to 1.8% by mass relative to the total mass of the covered electrode.

Advantageous Effects of Invention

In the Ni-base alloy weld metal according to the present invention, the contents of Cr, Fe, Mn, Ti, Si, Cu, N, Al, C, Mg, Mo, B, Zr, and Nb+Ta are properly specified, and the contents of Co, P, and S in incidental impurities are controlled in proper ranges. Furthermore, the content of Mn among these components is specified in a proper range and the contents of B and Zr are properly controlled as controlled components. Accordingly, a weld metal has high cracking resistance, the occurrence of weld defects is suppressed, and good bead appearance is achieved.

In the Ni-base alloy covered electrode according to the present invention, the contents of B and Zr are controlled in proper ranges and the N content is also low. Therefore, the occurrence of weld defects such as pits and blow holes is suppressed and a weld metal having high cracking resistance can be formed.

Furthermore, in the Ni-base alloy covered electrode according to the present invention, the contents of a slag-forming agent, a metal fluoride, a carbonate, and an alkali metal oxide contained in a covering material as flux components are specified in proper ranges, and the contents of Mn, Fe, Nb, and Ta in a flux are properly controlled as controlled components. Accordingly, good welding workability is achieved and a weld metal having good bead appearance is formed.

DESCRIPTION OF EMBODIMENT

Figure 1:
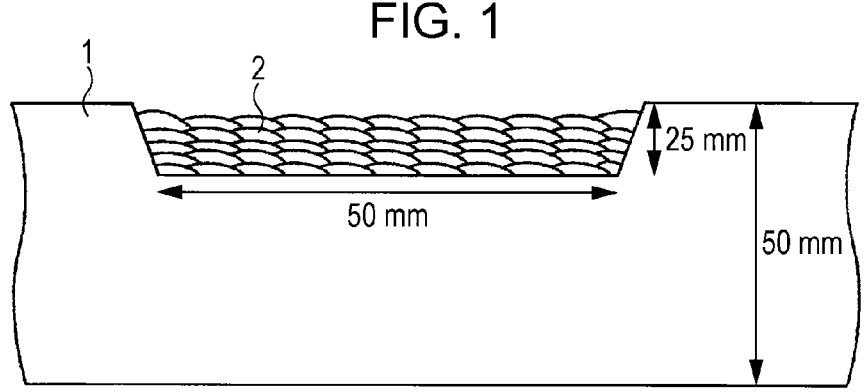
FIG. 1 is a diagram for describing a multi-layer overlay welding.

The present invention will now be described in detail. The inventors of the present application have conducted various experiments to solve a problem in that high cracking resistance cannot be achieved when a conventional welding material is used. Consequently, they have found the following and have completed the present invention. That is, the inventors have paid attention to the contents of Mn, B, and Zr that are components for improving the cracking resistance of a weld metal. By increasing the content of Mn compared with conventional weld metals, the reheat cracking resistance is improved. Furthermore, by treating B and Zr as controlled components and controlling the contents of B and Zr in proper ranges, a decrease in the solidification cracking resistance can be prevented.

The inventors of the present application have also found that by specifying, in proper ranges, the contents of a slag-forming agent, a metal fluoride, a carbonate, and an alkali metal oxide contained in a covering material of a covered electrode, the welding workability can be prevented from degrading when the above-described weld metal having high cracking resistance is formed.

The reason for the limitation of a composition of a Ni-base alloy weld metal and Ni-base alloy covered electrode of the present invention will now be described. The composition of the weld metal is the same as the composition of a core wire of the covered electrode except for N. First, the reason for the limitation of the compositions of the weld metal and core wire are described. In the paragraphs below that describe the reason for the limitation of the compositions, the content of each of components in the core wire of the covered electrode is a content relative to the total mass of the core wire, and the content of each of components in the weld metal is a content relative to the total mass of the weld metal.

"Cr: 28.0 to 31.5% by Mass Relative to the Total Mass"

Cr is a main element that improves the resistance to stress corrosion cracking in high-temperature and high-pressure water, and Cr is also effective for ensuring oxidation resistance and corrosion resistance. To sufficiently produce such effects, the Cr content needs to be 28.0% or more by mass relative to the total mass. On the other hand, if the covered electrode contains Cr in an amount of more than 31.5% relative to the total mass of the core wire, the workability of the core wire in the production of the covered electrode degrades. Therefore, in the present invention, the Cr content is specified to be 28.0 to 31.5% by mass relative to the total mass of the core wire. This Cr content satisfies the range provided in AWS A5.11 ENiCrFe-7.

"Fe: 7.0 to 11.0% by Mass Relative to the Total Mass"

To increase the tensile strength, Fe, which is being dissolved in a Ni alloy, is contained in an amount of 7.0% or more by mass. However, Fe is precipitated in a grain boundary in the form of a Laves phase $Fe_2Nb$ having a low melting point. The Laves phase is melted again due to reheat during multi-pass welding, which causes the reheat liquation cracking of the grain boundary. Therefore, the Fe content is set to be 11.0% or less by mass.

"C: 0.05% or Less by Mass Relative to the Total Mass"

C in a Ni alloy is a solid-solution hardening element and is effective for improving the tensile strength and creep rupture strength. However, since C forms a carbide with Cr and Mo and degrades the intergranular corrosion resistance and hot cracking resistance of a deposited metal, the C content is 0.05% or less by mass. To produce a solid-solution hardening effect through addition of C, the C content is preferably 0.03 to 0.05% by mass.

"Mn: 4.0 to 5.5% by Mass Relative to the Total Mass"

In a Ni-base alloy whose microstructure during welding is completely austenite, impurities segregate in a grain boundary during the solidification and thus the melting point of the grain boundary is decreased, which causes reheat cracking. In the present invention, when the content of Mn in the core wire of the covered electrode is 4.0% or more by mass, the production of a low melting point compound in a solidified weld is suppressed. Consequently, the reheat cracking resistance is significantly improved in a weld metal having the same composition. If the covered electrode contains Mn in a large amount of more than 5.5% by mass relative to the total mass of the core wire, it is difficult to process the core wire in the production of the covered electrode, and slag separation after welding also degrades. Therefore, the Mn content is specified to be 4.0 to 5.5% by mass. In the present invention, the Mn content is preferably 4.5 to 5.5% by mass relative to the total mass of the core wire or weld metal. Although this reason is described in Example 2 below, a Mn content of 4.5% or more by mass significantly improves the cracking resistance of the weld metal.

"N: 0.001 to 0.02% by Mass (Core Wire) and 0.005 to 0.08% by Mass (Weld Metal) Relative to the Total Mass"

N in a Ni alloy is a solid-solution hardening element. A N content of 0.001% by mass contributes to an increase in the tensile strength of a weld metal, but a high N content of more than 0.02% by mass causes weld defects such as blow holes and pits. Therefore, in the present invention, the N content is set to be 0.001 to 0.02% by mass. In the case of a weld metal, when the N content is 0.005% or more by mass, the tensile strength is favorably increased. However, if the N content is more than 0.08% by mass, weld defects such as blow holes and pits are caused. The upper limit of the N content in the weld metal is specified to be 0.08% by mass.

"Si: 0.70% or Less by Mass Relative to the Total Mass"

Si improves the cleanness in an alloy by being added as a deoxidizer. To produce such an effect, the Si content is preferably 0.15% or more by mass. However, since an excessively high Si content degrades the hot cracking resistance, the upper limit of the Si content is specified to be 0.70% or less by mass.

"Mg: 0.0010% or Less by Mass Relative to the Total Mass"

If the covered electrode contains a large amount of Mg, the welding workability such as slag separation degrades. Therefore, in the present invention, the upper limit of the Mg content is specified to be 0.0010% by mass.

"Al, Ti, and Cu: Each 0.50% or Less by Mass Relative to the Total Mass"

Each of the contents of Al, Ti, and Cu is specified to be 0.50% or less by mass to satisfy the range provided in AWS A5.11 ENiCrFe-7.

"Mo: 0.50% or Less by Mass Relative to the Total Mass"

Mo is added to improve the strength of a weld metal. However, a high Mo content of more than 0.50% by mass degrades the resistance to hot cracking susceptibility of a weld metal. This No content satisfies the range provided in AWS A5.11 ENiCrFe-7.

"Nb and Ta: 1.0 to 2.0% by Mass in Total Relative to the Total Mass"

Nb and Ta form stable carbides such as NbC and TaC, respectively, by being preferentially bonded to C in an alloy. Consequently, the production of a coarse carbide of Cr in a grain boundary is suppressed and thus the resistance to reheat cracking susceptibility is significantly improved. Therefore, in the present invention, the total content of Nb and Ta is 1.0% or more by mass. However, if the total content of Nb and Ta is more than 2.0%, the concentration of Nb and Ta occurs in a grain boundary due to solidifying segregation and an intermetallic compound phase (Laves phase) having a low melting point is formed. This causes solidification cracking and reheat cracking during welding. Furthermore, the toughness and workability are easily degraded due to an increase in the size of a carbide of Nb. The total content of Nb and Ta is preferably 1.0 to 1.7% by mass relative to the total mass of the core wire or weld metal.

"B and Zr: Each Controlled to be 0.0010% or Less by Mass Relative to the Total Mass"

B and Zr added to a Ni-base alloy in a trace amount produce effects of improving the strength of a grain boundary, the hot rolling property, and the reheat cracking resistance of a weld metal. B and Zr are generally said to improve the workability of a wire. However, in the present invention, B and Zr are not actively added and are treated as controlled components. That is, if the covered electrode and weld metal contain B and Zr in large amounts, the solidification cracking susceptibility of a weld metal is increased. Thus, each of the contents of B and Zr is controlled to be 0.0010% or less by mass.

"Co in Incidental Impurities: Controlled to be 0.10% or Less by Mass Relative to the Total Mass"

Co contained as an incidental impurity is transformed into the isotope Co-60 having a long half-life through irradiation with a neutron in a furnace and becomes a radiation source. Thus, the Co content is preferably as low as possible. In the present invention, the Co content is controlled to be 0.10% or less by mass and preferably 0.05% or less by mass.

"P and S in Incidental Impurities: Controlled to be 0.015% or Less by Mass Relative to the Total Mass"

P and S contained as incidental impurities segregate in a grain boundary when a weld metal is solidified, and a low melting point compound is easily formed in a segregated (highly concentrated) portion. This increases the weld cracking susceptibility, which causes solidification cracking.

Therefore, in the present invention, the contents of P and S in incidental impurities are each controlled to be 0.015% or less by mass.

Subsequently, the reason for the limitation of a composition of a flux in a covering material of the Ni-base alloy covered electrode of the present invention will be described.

"Slag-Forming Agent: 3.5 to 6.5% by Mass Relative to the Total Mass of Covered Electrode"

A slag-forming agent is added to a flux in an amount of 3.5% or more by mass to achieve good welding workability in terms of stability of an arc, the amount of spatters generated, slag separation, and the shape of a bead. If the covered electrode contains, as a flux component, a slag-forming agent in a large amount of more than 6.5% by mass relative to the total mass of the covered electrode, an amount of spatters is excessively increased and the arc stability is decreased, that is, the welding workability is degraded. Therefore, in the present invention, the content of a slag-forming agent is controlled to be 3.5 to 6.5% by mass relative to the total mass of the covered electrode. The slag-forming agent can be composed of $SiO_2$, $TiO_2$, MgO, $Al_2O_3$, or the like.

"Metal Fluoride (in Terms of F Content): 2 to 5% by Mass Relative to the Total Mass of Covered Electrode"

A metal fluoride produces effects of increasing arc intensity, improving the fluidity of slag by decreasing the viscosity and solidification temperature of slag, improving slag separation, preventing incomplete fusion, and preventing the formation of pits and blow holes. Thus, the metal fluoride is added in an amount of 2% or more by mass relative to the total mass of the covered electrode in terms of F content. However, if the content of the metal fluoride is excessively increased, the arc intensity is excessively increased and the amount of spatters is increased. Consequently, an undercut is easily caused and a convex bead is formed. Therefore, in the present invention, the upper limit of the content of the metal fluoride is specified to be 5% by mass in terms of F content. As the metal fluoride, sodium fluoride (NaF) is preferably contained in an amount of 0.7 to 1.8% by mass relative to the total mass of the covered electrode in terms of F content, which significantly improves the slag separation.

"Carbonate (in Terms of $CO_2$ Content): 2.5 to 6.5% by Mass Relative to the Total Mass of Covered Electrode"

By adding a carbonate, an arc is shielded with a gas generated by decomposing the carbonate at high temperature. Furthermore, by holding a weld metal in a highly basic state, a sound weld metal is ensured. The addition of a carbonate also contributes to achieving proper fluidity of slag and thus is effective for achieving good welding workability. In the present invention, to sufficiently produce such effects, the content of the carbonate is set to be 2.5% or more by mass relative to the total mass of the covered electrode in terms of $CO_2$ content. However, if the carbonate is added in a large amount, the slag separation and bead appearance are degraded. Therefore, in the present invention, the upper limit of the content of the carbonate is set to be 6.5% by mass relative to the total mass of the covered electrode in terms of $CO_2$ content.

"Alkali Metal Oxide: 0.7 to 1.8% by Mass Relative to the Total Mass of Covered Electrode"

By adding an alkali metal oxide such as $Li_2O$, $Na_2O$, or $K_2O$ in a proper amount, the arc stability is improved, the amount of spatters generated is decreased, and slag covering property is improved. In the present invention, the proper amount of the alkali metal oxide is specified to be 0.7 to 1.8% by mass relative to the total mass of the covered electrode. Note that the alkali metal oxide includes an alkali metal oxide derived from water glass contained in the covering material of the covered electrode.

"Mn in Flux: Controlled to be 2.0% or Less by Mass Relative to the Total Mass of Covered Electrode"

The addition of Mn to a flux degrades the welding workability such as slag separation. Therefore, in the present invention, the content of Mn in a flux is controlled to be 2.0% or less by mass relative to the total mass of the covered electrode.

"Nb and Ta in Flux: Controlled to be 1.5% or Less by Mass in Total Relative to the Total Mass of Covered Electrode"

As in the case of Mn, the addition of Nb to a flux also degrades the welding workability such as slag separation. Therefore, in the present invention, the content of Nb in a flux is controlled to be 1.5% or less by mass relative to the total mass of the covered electrode.

"Fe in Flux: Controlled to be 2.5% or Less by Mass Relative to the Total Mass of Covered Electrode"

As in the cases of Mn, Nb, and Ta, the addition of Fe to a flux also degrades the welding workability such as slag separation. Therefore, in the present invention, the content of Fe in a flux is controlled to be 2.5% or less by mass relative to the total mass of the covered electrode.

As described above, in the present invention, Mn, Nb, Ta, and Fe in the covering material are treated as controlled components in order to prevent the degradation of welding workability such as slag separation. That is, it is believed that the components Mn, Nb, Ta, and Fe in the covering material affect how the covering material (protective tube) melts, which degrades the slag separation. Alternatively, it is believed that the components Mn, Nb, Ta, and Fe added as raw materials of the covering material and impurity components contained in the alloy degrade the slag separation.

"Coverage: 25 to 45% by Weight"

If the coverage that indicates the weight ratio of a covering material relative to the total mass of a covered electrode is less than 25% by weight, the arc stability degrades and a protective tube deteriorates because of burning of an electrode. Thus, good welding workability cannot be achieved. Furthermore, the addition of alloy components from the covering material is limited. If the coverage is more than 45% by weight, the amount of slag is excessively increased and the slag precedes. This is not suitable for groove welding and the slag separation also degrades. Therefore, the coverage is set to be 25 to 45% by weight.

EXAMPLES

Example 1

The advantages of Examples of the present invention will now be described with reference to Comparative Examples that are outside the scope of the present invention. After a Ni alloy ingot containing 28.0 to 31.5% by mass of Cr was smelted in a vacuum melting furnace, forging, rolling, and wire drawing were performed to prepare a core wire for covered electrodes. In the smelting step, by changing the addition ratios of raw materials used, the concentrations of elements Ni, Cr, Fe, Mn, Ti, Si, Cu, N, Al, C, and Nb+Ta were adjusted. Regarding the controlled elements P, S, Mo, Co, Zr, B, and Mg, the concentrations were adjusted by not only the change in the addition ratios of raw materials but also the purities of main raw materials (Ni and Cr) used. Thus, nine types of core wires having various compositions were prepared. Tables 1-1 and 1-2 show the compositions of the core wires A to I.

TABLE 1-1

Type of core wire | Chemical composition in core wire (relative to the total mass of core wire, % by mass)
| Type of core wire | C | Si | Mn | P | S | Ni | Cr | Mo | Cu |
|---|---|---|---|---|---|---|---|---|---|
| A | 0.011 | 0.28 | 4.70 | 0.003 | 0.0030 | 55.48 | 29.71 | <0.005 | 0.01 |
| B | 0.010 | 0.32 | 3.00 | 0.003 | 0.0024 | 57.60 | 29.80 | <0.005 | <0.005 |
| C | 0.008 | 0.30 | 4.00 | 0.003 | 0.0028 | 57.68 | 29.33 | <0.005 | <0.005 |
| D | 0.014 | 0.29 | 4.60 | 0.003 | 0.0023 | 55.51 | 29.66 | <0.005 | <0.005 |
| E | 0.060 | 0.28 | 4.64 | 0.002 | 0.0025 | 55.64 | 29.69 | <0.005 | 0.01 |
| F | 0.011 | 0.80 | 4.68 | 0.003 | 0.0024 | 55.06 | 29.64 | <0.005 | <0.005 |
| G | 0.008 | 0.28 | 4.78 | 0.002 | 0.0021 | 55.43 | 29.63 | <0.005 | <0.005 |
| H | 0.009 | 0.29 | 4.73 | 0.003 | 0.0019 | 55.20 | 29.88 | <0.005 | 0.01 |
| I | 0.008 | 0.27 | 4.62 | 0.002 | 0.0030 | 55.71 | 29.70 | <0.005 | 0.01 |

TABLE 1-2

Type of core wire | Chemical composition in core wire (relative to the total mass of core wire, % by mass)
| Type of core wire | Nb + Ta | Al | Ti | Fe | Co | Zr | B | Mg | N |
|---|---|---|---|---|---|---|---|---|---|
| A | 1.58 | 0.018 | 0.003 | 8.20 | 0.01 | <0.0005 | <0.0005 | <0.0005 | 0.002 |
| B | 0.90 | 0.014 | 0.006 | 8.33 | 0.01 | <0.0005 | <0.0005 | <0.0005 | 0.003 |
| C | 0.44 | 0.016 | 0.008 | 8.20 | 0.01 | <0.0005 | <0.0005 | <0.0005 | 0.004 |
| D | 1.53 | 0.016 | 0.006 | 8.31 | 0.01 | <0.0005 | <0.0005 | <0.0005 | 0.050 |
| E | 1.54 | 0.020 | 0.005 | 8.10 | 0.01 | <0.0005 | <0.0005 | <0.0005 | 0.002 |
| F | 1.55 | 0.018 | 0.004 | 8.22 | 0.01 | <0.0005 | <0.0005 | <0.0005 | 0.002 |
| G | 1.53 | 0.014 | 0.006 | 8.30 | 0.01 | 0.0072 | <0.0005 | <0.0005 | 0.002 |
| H | 1.60 | 0.018 | 0.003 | 8.24 | 0.01 | <0.0005 | 0.0080 | <0.0005 | 0.002 |
| I | 1.49 | 0.017 | 0.005 | 8.15 | 0.01 | <0.0005 | <0.0005 | 0.0100 | 0.002 |

The prepared core wires A to I were coated with covering materials having various compositions and then dried to produce covered electrodes of Examples and Comparative Examples. The produced covered electrodes each had a diameter of 4.0 mm and a coverage of 34.1%. Tables 2-1 to 2-4 show the types of core wires A to I, the compositions of covering materials, and the compositions of metal components in the entire covered electrodes. In the case where the compositions of the core wire and covering material of each of the covered electrodes satisfy the preferred conditions of the present invention, a symbol "A" is given in the column of "Electrode" in Tables. In the case where the compositions do not satisfy the preferred conditions of the present invention, a symbol "B" is given in the column of "Electrode" in Tables.

TABLE 2-1

| | | | | Component of covering material (relative to the total mass of covered electrode, % by mass) | | | | | | | |
|---|---|---|---|---|---|---|---|---|---|---|---|
| | | | | Oxide in flux | | | | | | | |
| | | | | Slag-forming agent | | | | | Alkali metal oxide | | |
| | No. | Electrode | Core wire | SiO$_2$ | TiO$_2$ | MgO | Al$_2$O$_3$ | SiO$_2$ + TiO$_2$ + MgO + Al$_2$O$_3$ | K$_2$O | Na$_2$O | K$_2$O + Na$_2$O + Li$_2$O |
| Example | 1 | A1 | A | 3.5 | 1.2 | 0.3 | 0.1 | 5.1 | 0.95 | 0.01 | 1.25 |
| | 2 | A2 | A | 4.0 | 1.2 | 0.3 | 0.1 | 5.6 | 1.40 | 0.30 | 1.70 |
| | 3 | A3 | A | 3.0 | 1.2 | 0.2 | 0.5 | 4.9 | 1.00 | 0.30 | 1.30 |
| | 4 | A4 | A | 2.5 | 0.7 | 0.3 | 0.2 | 3.7 | 0.90 | 0.50 | 1.40 |
| | 5 | A5 | A | 3.3 | 0.8 | 0.3 | 0.7 | 5.1 | 1.00 | 0.45 | 1.45 |
| | 6 | A6 | A | 2.7 | 0.8 | 0.5 | 0.2 | 4.2 | 0.97 | 0.30 | 1.27 |
| Comparative Example | 7 | B7 | A | 3.5 | 2.2 | 0.3 | 1.0 | 7.0 | 0.96 | 0.30 | 1.26 |
| | 8 | B8 | A | 2.0 | 0.5 | 0.1 | 0.2 | 2.8 | 0.96 | 0.30 | 1.26 |
| | 9 | B9 | A | 3.0 | 1.1 | 0.2 | 0.2 | 4.5 | 0.40 | 0.20 | 0.60 |
| | 10 | B10 | A | 3.3 | 1.2 | 0.3 | 0.2 | 5.0 | 1.40 | 0.70 | 2.10 |
| | 11 | B11 | A | 3.2 | 1.2 | 0.7 | 0.2 | 5.3 | 0.96 | 0.30 | 1.26 |
| | 12 | B12 | A | 3.3 | 0.9 | 0.3 | 0.2 | 4.7 | 0.94 | 0.30 | 1.24 |
| | 13 | B13 | A | 3.1 | 1.0 | 0.6 | 0.2 | 4.9 | 0.96 | 0.30 | 1.26 |
| | 14 | B14 | A | 3.1 | 1.3 | 0.3 | 0.2 | 4.8 | 0.96 | 0.30 | 1.26 |
| | 15 | B15 | A | 3.1 | 0.9 | 0.6 | 0.2 | 4.8 | 0.96 | 0.30 | 1.26 |
| | 16 | B16 | B | 3.2 | 1.3 | 0.3 | 0.2 | 4.9 | 0.95 | 0.30 | 1.25 |
| | 17 | B17 | C | 3.0 | 1.6 | 0.3 | 0.2 | 5.1 | 0.96 | 0.30 | 1.26 |
| | 18 | B18 | A | 3.3 | 1.0 | 0.3 | 0.2 | 4.8 | 1.20 | 0.30 | 1.50 |
| | 19 | B19 | E | 3.3 | 1.1 | 0.3 | 0.2 | 4.9 | 0.96 | 0.30 | 1.26 |
| | 20 | B20 | F | 3.2 | 0.7 | 0.3 | 0.4 | 4.6 | 0.96 | 0.30 | 1.26 |
| | 21 | B21 | H | 3.3 | 1.3 | 0.3 | 0.0 | 4.9 | 0.90 | 0.30 | 1.20 |
| | 22 | B22 | G | 2.9 | 1.5 | 0.3 | 0.2 | 4.9 | 0.96 | 0.30 | 1.26 |

TABLE 2-1-continued

Component of covering material (relative to the total mass of covered electrode, % by mass)
Oxide in flux Slag-forming agent

| | | | | | | | $SiO_2 +$ $TiO_2 +$ $MgO +$ | Alkali metal oxide | | $K_2O +$ $Na_2O +$ |
|---|---|---|---|---|---|---|---|---|---|---|
| No. | Electrode | Core wire | $SiO_2$ | $TiO_2$ | MgO | $Al_2O_3$ | $Al_2O_3$ | $K_2O$ | $Na_2O$ | $Li_2O$ |
| 23 | B23 | I | 3.2 | 1.2 | 0.3 | 0.2 | 4.9 | 1.03 | 0.30 | 1.33 |
| 24 | B24 | A | 3.1 | 1.3 | 0.3 | 0.2 | 4.8 | 0.96 | 0.30 | 1.26 |
| 25 | B25 | D | 3.0 | 1.3 | 0.6 | 0.2 | 5.0 | 1.00 | 0.30 | 1.30 |

15

TABLE 2-2

Component of covering material (relative to the total mass of covered electrode, % by mass)

| | | | | Fluoride in flux | | | | Carbonate in flux | | | |
|---|---|---|---|---|---|---|---|---|---|---|---|
| | | | | | | | | | $[CO_2]$ | | $[CO_2]$ |
| | | Core | | [F] (in | | [F] (in | | | (in | | (in | Total |
| No. | Electrode | wire | NaF | NaF) | $CaF_2$ | $CaF_2$) | Total [F] | $CaCO_3$ | $CaCO_3$) | $BaCO_3$ | $BaCO_3$) | $[CO_2]$ |

| | No. | Electrode | Core wire | NaF | [F] (in NaF) | $CaF_2$ | [F] (in $CaF_2$) | Total [F] | $CaCO_3$ | $[CO_2]$ (in $CaCO_3$) | $BaCO_3$ | $[CO_2]$ (in $BaCO_3$) | Total $[CO_2]$ |
|---|---|---|---|---|---|---|---|---|---|---|---|---|---|
| Example | 1 | A1 | A | 1.23 | 0.56 | 5.99 | 2.92 | 3.5 | 8.6 | 3.78 | 1.0 | 0.22 | 4.0 |
| | 2 | A2 | A | 1.50 | 0.68 | 6.90 | 3.36 | 4.0 | 7.0 | 3.08 | 1.2 | 0.27 | 3.3 |
| | 3 | A3 | A | 0.80 | 0.36 | 3.90 | 1.90 | 2.3 | 6.4 | 2.82 | 0.9 | 0.20 | 3.0 |
| | 4 | A4 | A | 1.20 | 0.54 | 8.00 | 3.89 | 4.4 | 11.0 | 4.84 | 1.5 | 0.33 | 5.2 |
| | 5 | A5 | A | 1.36 | 0.62 | 6.54 | 3.18 | 3.8 | 9.0 | 3.96 | 1.1 | 0.25 | 4.2 |
| | 6 | A6 | A | 1.40 | 0.63 | 8.00 | 3.89 | 4.5 | 6.5 | 2.86 | 0.8 | 0.18 | 3.0 |
| Comparative | 7 | B7 | A | 1.35 | 0.61 | 6.55 | 3.19 | 3.8 | 8.3 | 3.65 | 0.8 | 0.18 | 3.8 |
| Example | 8 | B8 | A | 1.35 | 0.61 | 6.55 | 3.19 | 3.8 | 8.3 | 3.65 | 0.8 | 0.18 | 3.8 |
| | 9 | B9 | A | 1.35 | 0.61 | 6.55 | 3.19 | 3.8 | 8.3 | 3.65 | 0.8 | 0.18 | 3.8 |
| | 10 | B10 | A | 1.35 | 0.61 | 6.55 | 3.19 | 3.8 | 8.3 | 3.65 | 0.8 | 0.18 | 3.8 |
| | 11 | B11 | A | 1.00 | 0.45 | 1.50 | 0.73 | 1.2 | 8.3 | 3.65 | 0.8 | 0.18 | 3.8 |
| | 12 | B12 | A | 3.00 | 1.36 | 9.00 | 4.38 | 5.7 | 8.3 | 3.65 | 0.8 | 0.18 | 3.8 |
| | 13 | B13 | A | 1.35 | 0.61 | 6.55 | 3.19 | 3.8 | 4.0 | 1.76 | 0.8 | 0.18 | 1.9 |
| | 14 | B14 | A | 1.35 | 0.61 | 5.00 | 2.43 | 3.0 | 13.0 | 5.72 | 5.0 | 1.11 | 6.8 |
| | 15 | B15 | A | 1.35 | 0.61 | 6.55 | 3.19 | 3.8 | 8.3 | 3.65 | 0.8 | 0.18 | 3.8 |
| | 16 | B16 | B | 1.35 | 0.61 | 6.55 | 3.19 | 3.8 | 8.3 | 3.65 | 0.8 | 0.18 | 3.8 |
| | 17 | B17 | C | 1.35 | 0.61 | 6.55 | 3.19 | 3.8 | 8.3 | 3.65 | 0.8 | 0.18 | 3.8 |
| | 18 | B18 | A | 1.35 | 0.61 | 6.55 | 3.19 | 3.8 | 8.3 | 3.65 | 0.8 | 0.18 | 3.8 |
| | 19 | B19 | E | 1.35 | 0.61 | 6.55 | 3.19 | 3.8 | 8.3 | 3.65 | 0.8 | 0.18 | 3.8 |
| | 20 | B20 | F | 1.35 | 0.61 | 6.55 | 3.19 | 3.8 | 8.3 | 3.65 | 0.8 | 0.18 | 3.8 |
| | 21 | B21 | H | 1.35 | 0.61 | 6.55 | 3.19 | 3.8 | 8.3 | 3.65 | 0.8 | 0.18 | 3.8 |
| | 22 | B22 | G | 1.35 | 0.61 | 6.55 | 3.19 | 3.8 | 8.3 | 3.65 | 0.8 | 0.18 | 3.8 |
| | 23 | B23 | I | 1.35 | 0.61 | 6.55 | 3.19 | 3.8 | 8.3 | 3.65 | 0.8 | 0.18 | 3.8 |
| | 24 | B24 | A | 1.35 | 0.61 | 6.55 | 3.19 | 3.8 | 8.3 | 3.65 | 0.8 | 0.18 | 3.8 |
| | 25 | B25 | D | 1.35 | 0.61 | 6.55 | 3.19 | 3.8 | 8.3 | 3.65 | 0.8 | 0.18 | 3.8 |

TABLE 2-3

Component of covering material (relative to the total mass of covered electrode, % by mass)
Metal component in flux

| | No. | Electrode | Core wire | Mn | Nb + Ta | Fe | Other metal components such as Ni, Cr, Si, and Mg |
|---|---|---|---|---|---|---|---|
| Example | 1 | A1 | A | 0.9 | 0.1 | 0.7 | 8.3 |
| | 2 | A2 | A | 1.0 | 0.2 | 0.7 | 7.2 |
| | 3 | A3 | A | 1.0 | 0.2 | 0.7 | 12.9 |
| | 4 | A4 | A | 1.0 | 0.2 | 0.7 | 4.3 |
| | 5 | A5 | A | 1.0 | 0.2 | 0.7 | 6.5 |
| | 6 | A6 | A | 1.1 | 1.0 | 0.9 | 8.1 |
| Comparative | 7 | B7 | A | 0.9 | 0.2 | 1.7 | 4.9 |
| Example | 8 | B8 | A | 1.0 | 0.4 | 1.2 | 9.4 |
| | 9 | B9 | A | 0.9 | 0.5 | 1.7 | 8.1 |
| | 10 | B10 | A | 1.1 | 0.3 | 1.0 | 6.8 |

TABLE 2-3-continued

Component of covering material (relative to the total mass of covered electrode, % by mass)
Metal component in flux

| No. | Electrode | Core wire | Mn | Nb + Ta | Fe | Other metal components such as Ni, Cr, Si, and Mg |
|---|---|---|---|---|---|---|
| 11 | B11 | A | 1.1 | 0.3 | 0.7 | 13.2 |
| 12 | B12 | A | 1.0 | 0.2 | 0.8 | 4.0 |
| 13 | B13 | A | 1.2 | 0.8 | 0.8 | 11.4 |
| 14 | B14 | A | 0.8 | 0.5 | 0.7 | 0.4 |
| 15 | B15 | A | 2.2 | 0.3 | 0.8 | 6.7 |
| 16 | B16 | B | 1.1 | 0.1 | 0.7 | 7.9 |
| 17 | B17 | C | 1.0 | 0.5 | 0.8 | 7.4 |
| 18 | B18 | A | 1.0 | 1.8 | 1.0 | 5.9 |
| 19 | B19 | E | 1.0 | 0.3 | 1.1 | 7.4 |
| 20 | B20 | F | 1.0 | 0.2 | 0.8 | 8.2 |
| 21 | B21 | H | 1.1 | 0.3 | 0.8 | 7.8 |
| 22 | B22 | G | 1.2 | 0.2 | 0.7 | 7.7 |
| 23 | B23 | I | 1.2 | 0.4 | 0.7 | 7.5 |
| 24 | B24 | A | 1.3 | 0.3 | 3.2 | 5.1 |
| 25 | B25 | D | 1.0 | 0.6 | 0.6 | 7.5 |

TABLE 2-4

| | No. | Electrode | Core wire | Composition of metal component in the entire covered electrode | | | | | | |
|---|---|---|---|---|---|---|---|---|---|---|
| | | | | Si | Mn | Ni | Cr | Mo | Nb + Ta | Fe |
| Example | 1 | A1 | A | 0.2 | 4.0 | 39.5 | 23.0 | 0.0 | 1.1 | 6.0 |
| | 2 | A2 | A | 0.2 | 4.1 | 38.3 | 23.1 | 0.0 | 1.2 | 6.0 |
| | 3 | A3 | A | 0.2 | 4.1 | 43.8 | 23.3 | 0.0 | 1.2 | 6.0 |
| | 4 | A4 | A | 0.2 | 4.1 | 36.5 | 22.0 | 0.0 | 1.2 | 6.0 |
| | 5 | A5 | A | 0.2 | 4.1 | 37.9 | 22.8 | 0.0 | 1.2 | 6.0 |
| | 6 | A6 | A | 0.2 | 4.2 | 39.6 | 22.7 | 0.0 | 2.0 | 6.2 |
| Comparative | 7 | B7 | A | 0.2 | 4.0 | 37.1 | 22.0 | 0.0 | 1.2 | 7.0 |
| Example | 8 | B8 | A | 0.2 | 4.1 | 40.3 | 23.3 | 0.0 | 1.4 | 6.5 |
| | 9 | B9 | A | 0.2 | 4.0 | 39.0 | 23.3 | 0.0 | 1.5 | 7.1 |
| | 10 | B10 | A | 0.2 | 4.2 | 39.9 | 21.0 | 0.0 | 1.3 | 6.3 |
| | 11 | B11 | A | 0.2 | 4.2 | 44.8 | 22.5 | 0.0 | 1.3 | 6.0 |
| | 12 | B12 | A | 0.2 | 4.1 | 36.7 | 21.5 | 0.0 | 1.2 | 6.1 |
| | 13 | B13 | A | 0.2 | 4.3 | 42.3 | 23.3 | 0.0 | 1.8 | 6.1 |
| | 14 | B14 | A | 0.2 | 3.9 | 34.6 | 20.0 | 0.0 | 1.5 | 6.0 |
| | 15 | B15 | A | 0.2 | 5.3 | 37.7 | 23.2 | 0.0 | 1.3 | 6.1 |
| | 16 | B16 | B | 0.2 | 3.0 | 39.9 | 23.3 | 0.0 | 1.1 | 6.0 |
| | 17 | B17 | C | 0.2 | 3.6 | 39.7 | 23.1 | 0.0 | 0.8 | 6.1 |
| | 18 | B18 | A | 0.2 | 4.1 | 36.8 | 23.3 | 0.0 | 2.8 | 6.3 |
| | 19 | B19 | E | 0.2 | 4.0 | 38.5 | 23.2 | 0.0 | 1.3 | 6.4 |
| | 20 | B20 | F | 0.4 | 4.0 | 39.2 | 23.0 | 0.0 | 1.2 | 6.1 |
| | 21 | B21 | H | 0.2 | 4.2 | 39.0 | 22.9 | 0.0 | 1.3 | 6.2 |
| | 22 | B22 | G | 0.2 | 4.3 | 39.0 | 22.8 | 0.0 | 1.3 | 6.1 |
| | 23 | B23 | I | 0.2 | 4.2 | 39.0 | 22.9 | 0.0 | 1.3 | 6.0 |
| | 24 | B24 | A | 0.2 | 4.4 | 36.1 | 23.2 | 0.0 | 1.3 | 8.5 |
| | 25 | B25 | D | 0.2 | 4.0 | 38.4 | 23.3 | 0.0 | 1.6 | 6.0 |

The welding workability and bead appearance as a result of welding performed using each of the covered electrodes of Examples and Comparative Examples were evaluated. Furthermore, regarding the weld metal formed of each of the covered electrodes of Examples and Comparative Examples, the reheat cracking resistance, the presence or absence of hot cracking, and the degree of formation of pits were evaluated. The evaluation test methods are described below.

"Multi-Layer Overlay Welding Test"

As shown in FIG. 1, a Mn—Ni—Mo-based low-alloy steel sheet for pressure vessels, which is provided in ASTM A533B CL. 2 (corresponding JIS standard: JIS G 3120/SQV2B), was used as a base metal 1 and five-layer overlay welding was performed on the base metal 1. The welding was performed under the following conditions: the polarity was DC+, the welding current was 130 A, the welding voltage was 25 V, and the welding speed was 150 to 200 mm/min. The thickness of the base metal was 50 mm, the depth of the overlay welding was 25 mm, and the width of the bottom was 50 mm. Tables 3-1 and 3-2 show chemical composition of weld metals formed of the covered electrodes of Examples and Comparative Examples. In each of Examples and Comparative Examples, five test pieces were cut out in a direction perpendicular to the surface of a weld bead so as to have a thickness of 6.5 mm. A liquid penetrant test was performed on each of cross sections subjected to bending with a bend radius of about 50 mm to evaluate the degree of formation of cracking. Regarding the ten cross sections of the bended test pieces, the number of cracks having a length of 0.1 mm or more was counted to evaluate the reheat cracking resistance. When the total number of cracks on the ten cross sections was less than 1, an evaluation of "A" was given. When the total number was 1.0 or more and less than 5.0, an evaluation of "B" was given.

When the total number was 5.0 or more and less than 15, an evaluation of "C" was given. When the total number was 15 or more, an evaluation of "D" was given. At the same time, the number of pits formed was also counted in the same manner, and the same evaluation as above was performed. In addition, when welding was performed using each of the covered electrodes of Examples and Comparative Examples, the amount of spatters generated, the bead appearance of a weld metal, and the slag separation were evaluated through visual inspection. When the amount of spatters generated was small, an evaluation of "A" was given. When the amount was slightly large, an evaluation of "B" was given. The bead appearance and slag separation were evaluated using the following evaluation criteria. In an evaluation of "A", because of good conformability, a bead is uniformly formed in a straight line and good slag separation is achieved. In an evaluation of "B", since the conformability is slightly poor and the uniformity of a bead is poor, the bead line becomes slightly wavy and the slag separation is slightly degraded. In an evaluation of "C", since the conformability is significantly poor and the uniformity of a bead is significantly poor, the bead line becomes wavy and the slag separation is degraded.

"Hot Cracking Test"

Figure 2:
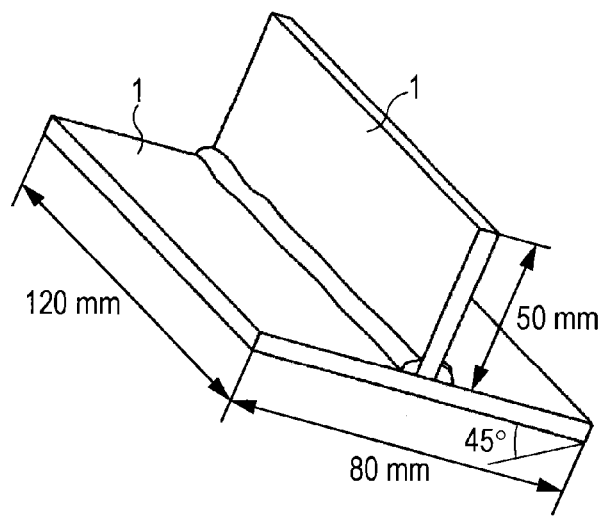
FIG. 2 is a diagram showing a T-shaped joint in a hot cracking test.

A hot cracking test was performed in accordance with JIS Z 3153. FIG. 2 shows the shape of a sample used in this hot cracking test. A T-shaped joint was made using two test pieces shown in FIG. 2, and fillet welding was performed along the entire lengths of two fillet portions. The test electrode had a diameter of 4.0 mm, and the welding was performed under the following conditions: the polarity was DC, the welding current was 150 A, the welding voltage was 25 V, and the welding speed was 300 mm/min. The ratio of hot cracking in the fillet portions was evaluated. When no cracking was caused, an evaluation of "A" was given. When cracking was caused and the ratio of cracking relative to the entire length of a welded portion was less than 5.0%, an evaluation of "B" was given. When the ratio of cracking was 5.0% or more and less than 10.0%, an evaluation of "C" was given. When the ratio of cracking was 10.0% or more, an evaluation of "D" was given. Table 3-3 also shows the results of the hot cracking test with the test pieces of Examples and Comparative Examples.

Regarding the overall evaluation, "Poor" was given when any of the reheat cracking resistance, the presence or absence of hot cracking, the bead appearance and slag separation, the amount of spatters generated, and the degree of formation of pits had an evaluation of "C" or "D". When such evaluation items had no evaluation of "C" or "D", "Good" was given. When all the evaluation items had an evaluation of "A", "Excellent" was given.

TABLE 3-1

| | | | Core | Chemical composition of weld metal (% by mass) | | | | | | | | |
|---|---|---|---|---|---|---|---|---|---|---|---|---|
| | No. | Electrode | wire | C | Si | Mn | P | S | Ni | Cr | Mo | Cu |
| Example | 1 | A1 | A | 0.042 | 0.44 | 4.78 | 0.006 | 0.0025 | 53.6 | 30.9 | <0.005 | <0.005 |
| | 2 | A2 | A | 0.042 | 0.44 | 4.96 | 0.006 | 0.0025 | 52.7 | 31.4 | <0.005 | <0.005 |
| | 3 | A3 | A | 0.042 | 0.41 | 4.60 | 0.006 | 0.0025 | 55.8 | 0.0 | <0.005 | <0.005 |
| | 4 | A4 | A | 0.042 | 0.46 | 5.16 | 0.006 | 0.0025 | 52.4 | 31.1 | <0.005 | <0.005 |
| | 5 | A5 | A | 0.042 | 0.45 | 5.00 | 0.006 | 0.0025 | 52.7 | 31.3 | <0.005 | <0.005 |
| | 6 | A6 | A | 0.035 | 0.43 | 4.95 | 0.005 | 0.0023 | 53.3 | 30.0 | <0.005 | <0.005 |
| | 7 | B7 | A | 0.045 | 0.45 | 4.93 | 0.004 | 0.0020 | 51.9 | 30.5 | <0.005 | <0.005 |
| | 8 | B8 | A | 0.041 | 0.43 | 4.77 | 0.007 | 0.0030 | 53.3 | 30.5 | <0.005 | <0.005 |
| | 9 | B9 | A | 0.038 | 0.43 | 4.70 | 0.006 | 0.0030 | 52.1 | 30.8 | <0.005 | <0.005 |
| | 10 | B10 | A | 0.048 | 0.44 | 5.08 | 0.001 | 0.0030 | 54.9 | 28.5 | <0.005 | <0.005 |
| | 11 | B11 | A | 0.035 | 0.41 | 4.63 | 0.005 | 0.0030 | 56.9 | 28.2 | <0.005 | <0.005 |
| | 12 | B12 | A | 0.040 | 0.46 | 5.18 | 0.003 | 0.0020 | 52.7 | 30.5 | <0.005 | <0.005 |
| | 13 | B13 | A | 0.035 | 0.41 | 4.86 | 0.005 | 0.0030 | 54.6 | 29.6 | <0.005 | <0.005 |
| | 14 | B14 | A | 0.050 | 0.49 | 5.18 | 0.008 | 0.0030 | 52.6 | 29.9 | <0.005 | <0.005 |
| Comparative | 15 | B15 | A | 0.044 | 0.44 | 6.33 | 0.008 | 0.0030 | 51.4 | 31.1 | <0.005 | <0.005 |
| Example | 16 | B16 | B | 0.039 | 0.44 | 3.60 | 0.008 | 0.0020 | 54.3 | 31.4 | <0.005 | <0.005 |
| | 17 | B17 | C | 0.042 | 0.44 | 4.32 | 0.004 | 0.0040 | 53.9 | 31.1 | <0.005 | <0.005 |
| | 18 | B18 | A | 0.044 | 0.44 | 4.92 | 0.006 | 0.0030 | 50.8 | 31.4 | <0.005 | <0.005 |
| | 19 | B19 | E | 0.090 | 0.44 | 4.79 | 0.007 | 0.0030 | 52.4 | 31.2 | <0.005 | <0.005 |
| | 20 | B20 | F | 0.037 | 0.94 | 4.77 | 0.004 | 0.0020 | 52.9 | 30.8 | <0.005 | <0.005 |
| | 21 | B21 | H | 0.042 | 0.44 | 5.02 | 0.008 | 0.0030 | 53.0 | 30.8 | <0.005 | <0.005 |
| | 22 | B22 | G | 0.049 | 0.44 | 5.15 | 0.005 | 0.0020 | 53.1 | 30.7 | <0.005 | <0.005 |
| | 23 | B23 | I | 0.043 | 0.44 | 5.03 | 0.009 | 0.0030 | 53.2 | 30.8 | <0.005 | <0.005 |
| | 24 | B24 | A | 0.037 | 0.44 | 5.26 | 0.008 | 0.0020 | 48.8 | 31.2 | <0.005 | <0.005 |
| | 25 | B25 | D | 0.038 | 0.44 | 4.80 | 0.009 | 0.0020 | 52.5 | 31.4 | <0.005 | <0.005 |

TABLE 3-2

| | | | Core | Chemical composition of weld metal (% by mass) | | | | | | | |
|---|---|---|---|---|---|---|---|---|---|---|---|
| | No. | Electrode | wire | Nb + Ta | Al | Ti | Fe | Co | Zr | B | Mg | N |
| Example | 1 | A1 | A | 1.1 | 0.030 | 0.015 | 9.02 | 0.020 | <0.0005 | <0.0005 | <0.0005 | 0.03 |
| | 2 | A2 | A | 1.2 | 0.030 | 0.015 | 9.13 | 0.020 | <0.0005 | <0.0005 | <0.0005 | 0.03 |
| | 3 | A3 | A | 1.1 | 0.030 | 0.015 | 8.48 | 0.020 | <0.0005 | <0.0005 | <0.0005 | 0.03 |
| | 4 | A4 | A | 1.3 | 0.030 | 0.015 | 9.50 | 0.020 | <0.0005 | <0.0005 | <0.0005 | 0.03 |
| | 5 | A5 | A | 1.2 | 0.030 | 0.015 | 9.21 | 0.020 | <0.0005 | <0.0005 | <0.0005 | 0.03 |
| | 6 | A6 | A | 2.0 | 0.023 | 0.018 | 9.19 | 0.021 | <0.0005 | <0.0005 | <0.0005 | 0.03 |
| | 7 | B7 | A | 1.2 | 0.040 | 0.017 | 10.86 | 0.023 | <0.0005 | <0.0005 | <0.0005 | 0.02 |
| | 8 | B8 | A | 1.4 | 0.035 | 0.019 | 9.52 | 0.022 | <0.0005 | <0.0005 | <0.0005 | 0.03 |
| | 9 | B9 | A | 1.5 | 0.033 | 0.020 | 10.42 | 0.020 | <0.0005 | <0.0005 | <0.0005 | 0.03 |

TABLE 3-2-continued

|  | No. | Electrode | Core wire | Chemical composition of weld metal (% by mass) | | | | | | | | |
|---|---|---|---|---|---|---|---|---|---|---|---|---|
|  |  |  |  | Nb + Ta | Al | Ti | Fe | Co | Zr | B | Mg | N |
|  | 10 | B10 | A | 1.3 | 0.033 | 0.020 | 9.58 | 0.019 | <0.0005 | <0.0005 | <0.0005 | 0.03 |
|  | 11 | B11 | A | 1.2 | 0.030 | 0.019 | 8.43 | 0.018 | <0.0005 | <0.0005 | <0.0005 | 0.02 |
|  | 12 | B12 | A | 1.3 | 0.039 | 0.021 | 9.69 | 0.019 | <0.0005 | <0.0005 | <0.0005 | 0.03 |
|  | 13 | B13 | A | 1.7 | 0.030 | 0.020 | 8.68 | 0.018 | <0.0005 | <0.0005 | <0.0005 | 0.04 |
|  | 14 | B14 | A | 1.7 | 0.030 | 0.022 | 10.03 | 0.018 | <0.0005 | <0.0005 | <0.0005 | 0.02 |
| Comparative Example | 15 | B15 | A | 1.3 | 0.032 | 0.018 | 9.17 | 0.017 | <0.0005 | <0.0005 | <0.0005 | 0.03 |
|  | 16 | B16 | B | 1.1 | 0.034 | 0.015 | 9.05 | 0.016 | <0.0005 | <0.0005 | <0.0005 | 0.03 |
|  | 17 | B17 | C | 0.8 | 0.033 | 0.020 | 9.21 | 0.019 | <0.0005 | <0.0005 | <0.0005 | 0.04 |
|  | 18 | B18 | A | 2.8 | 0.030 | 0.016 | 9.51 | 0.020 | <0.0005 | <0.0005 | <0.0005 | 0.02 |
|  | 19 | B19 | E | 1.3 | 0.029 | 0.019 | 9.64 | 0.021 | <0.0005 | <0.0005 | <0.0005 | 0.03 |
|  | 20 | B20 | F | 1.2 | 0.038 | 0.020 | 9.16 | 0.017 | <0.0005 | <0.0005 | <0.0005 | 0.02 |
|  | 21 | B21 | H | 1.3 | 0.030 | 0.020 | 9.33 | 0.019 | <0.0005 | 0.0015 | <0.0005 | 0.03 |
|  | 22 | B22 | G | 1.3 | 0.024 | 0.018 | 9.19 | 0.020 | 0.002 | <0.0005 | <0.0005 | 0.03 |
|  | 23 | B23 | I | 1.3 | 0.033 | 0.018 | 9.04 | 0.024 | <0.0005 | <0.0005 | 0.002 | 0.02 |
|  | 24 | B24 | A | 1.3 | 0.030 | 0.019 | 12.79 | 0.022 | <0.0005 | <0.0005 | <0.0005 | 0.03 |
|  | 25 | B25 | D | 1.6 | 0.031 | 0.020 | 9.06 | 0.023 | <0.0005 | <0.0005 | <0.0005 | 0.09 |

TABLE 3-3

|  | No. | Electrode | Core wire | Reheat cracking resistance | Presence or absence of formation of hot cracking | Pit | Bead appearance/ slag separation | Amount of spatters generated | Overall |
|---|---|---|---|---|---|---|---|---|---|
| Example | 1 | A1 | A | A | A | A | A | A | Excellent |
|  | 2 | A2 | A | A | A | A | A | A | Excellent |
|  | 3 | A3 | A | A | A | A | A | A | Excellent |
|  | 4 | A4 | A | A | A | A | A | A | Excellent |
|  | 5 | A5 | A | A | A | A | A | A | Excellent |
|  | 6 | A6 | A | A | A | A | A | A | Excellent |
|  | 7 | B7 | A | A | A | A | B | B | Good |
|  | 8 | B8 | A | A | A | A | B | B | Good |
|  | 9 | B9 | A | A | A | A | A | B | Good |
|  | 10 | B10 | A | A | A | A | B | B | Good |
|  | 11 | B11 | A | A | A | A | B | A | Good |
|  | 12 | B12 | A | A | A | A | B | B | Good |
|  | 13 | B13 | A | A | A | A | A | B | Good |
|  | 14 | B14 | A | A | A | A | B | A | Good |
| Comparative Example | 15 | B15 | A | A | A | A | C | A | Poor |
|  | 16 | B16 | B | C | A | A | A | A | Poor |
|  | 17 | B17 | C | C | A | A | A | A | Poor |
|  | 18 | B18 | A | D | B | A | C | A | Poor |
|  | 19 | B19 | E | A | C | A | A | A | Poor |
|  | 20 | B20 | F | A | C | A | A | A | Poor |
|  | 21 | B21 | H | A | C | A | A | A | Poor |
|  | 22 | B22 | G | A | C | A | A | A | Poor |
|  | 23 | B23 | I | A | A | A | C | A | Poor |
|  | 24 | B24 | A | C | C | A | C | A | Poor |
|  | 25 | B25 | D | A | A | D | A | A | Poor |

As shown in Tables 3-1 to 3-3, in Examples No. 1 to No. 14, since the compositions of the weld metals were within the scope of the present invention, the reheat cracking resistance and hot cracking resistance were high and pits were not formed. In Examples No. 1 to No. 7, the compositions of the covered electrodes used for welding satisfy the preferred conditions of the present invention. Therefore, the amount of spatters generated during welding was small, and the formed weld metal had good bead appearance and slag separation and good welding workability was achieved. As described above, when a Ni-base alloy weld metal having high cracking resistance and good bead appearance, which are essential conditions of the present invention, is formed, good welding workability can be achieved by using the Ni-base alloy covered electrode that satisfies the preferred conditions of the present invention.

In contrast, in Comparative Examples No. 15 to No. 25, since the compositions of the weld metals are outside the scope of the present invention, at least one of the reheat cracking resistance, the hot cracking resistance, the bead appearance/slag separation, the formation of pits, and the amount of spatters generated was degraded. In Comparative Example No. 15, the content of Mn in a flux among the components of the covered electrode used for welding was high. Thus, the Mn content in the formed weld metal also exceeded the range specified in the present invention, resulting in the degradation of slag separation. In Comparative Example No. 16, since a covered electrode in which the Mn content in a core wire was below the range specified in the present invention was used, the Mn content in the formed weld metal was also below the range specified in the present invention, resulting in the degradation of the reheat cracking resistance of the weld metal.

In Comparative Example No. 17, since a covered electrode in which the total content of Nb and Ta in a core wire was below the range specified in the present invention was used, the total content of Nb and Ta in the formed weld metal was also below the range specified in the present invention, resulting in the degradation of the reheat cracking resistance of the weld metal. In Comparative Example No. 18, the total content of Nb and Ta in a flux of the covered electrode was high and thus the slag separation was degraded. Consequently, the total content of Nb and Ta in the formed weld metal also exceeded the range specified in the present invention, resulting in the degradation of the reheat cracking resistance and hot cracking resistance. In Comparative Example No. 19, since a covered electrode in which the C content in a core wire was high was used, the C content in the formed weld metal was excessively high, resulting in the degradation of the hot cracking resistance. In Comparative Example No. 20, since a covered electrode in which the Si content in a core wire was high was used, the Si content in the formed weld metal was excessively high, resulting in the degradation of the hot cracking resistance.

In Comparative Example No. 21, since a covered electrode in which the B content in a core wire was high was used, the B content in the formed weld metal was excessively high, resulting in the degradation of the hot cracking resistance. Similarly, in Comparative Example No. 22, since a covered electrode in which the Zr content in a core wire was high was used, the Zr content in the formed weld metal was excessively high, resulting in the degradation of the hot cracking resistance.

In Comparative Example No. 23, since a covered electrode in which the Mg content in a core wire exceeded the range specified in the present invention was used, the Mg content in the formed weld metal was excessively high, resulting in the degradation of the slag separation and welding workability. In Comparative Example No. 24, the Fe content in a flux among the components of the covered electrode was high. Thus, the Fe content in the formed weld metal was excessively high, resulting in the degradation of the reheat cracking resistance, hot cracking resistance, and slag separation. In Comparative Example No. 25, since a covered electrode in which the N content in a core wire was high was used, the N content in the formed weld metal was excessively high, which increased the number of pits formed.

Example 2

Figure 3:
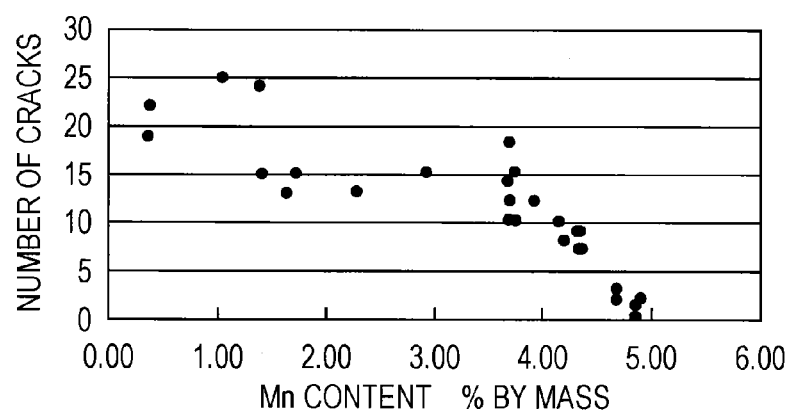
FIG. 3 is a graph showing the relationship between the Mn content and the number of cracks formed in a multi-layer overlay welding.

The Mn content in the Ni-base alloy covered electrode of the present invention and the weld metal will now be described. FIG. 3 shows the number of cracks having a length of 0.1 mm or more and formed in the same multilayer overlay welding test as that of Example 1 as a function of the Mn content in the Ni-base alloy covered electrode and Ni-base alloy weld metal. In the Ni-base alloy covered electrode and Ni-base alloy weld metal shown in FIG. 3, the contents of elements other than Mn and Nb+Ta satisfy the ranges provided in AWS A5.11 ENiCrFe-7 and the total content of Nb and Ta satisfies the range (1.0 to 2.0% by mass relative to the total mass) specified in the present invention.

As is clear from FIG. 3, the cracking resistance of a weld metal containing Mn in an amount of 4.0 to 5.0% by mass relative to the total mass is improved. In particular, when the Mn content is 4.5% or more by mass, the cracking resistance is significantly improved. As described above, in the present invention, the cracking resistance of a weld metal can be improved by forming a weld metal containing Mn in an amount of 4.0% or more by mass (preferably 4.5% or more by mass).

REFERENCE SIGNS LIST 1 base metal
2 overlay welding

The invention claimed is:

1. A Ni-base alloy covered electrode comprising a core wire composed of a Ni-base alloy and a covering material that contains a component of a flux and covers a periphery of the core wire,
   wherein the core wire contains, relative to the total mass of the core wire,
   Cr: 28.0 to 31.5% by mass,
   Fe: 7.0 to 11.0% by mass,
   Nb and Ta: 1.0 to 2.0% by mass in total,
   C: 0.05% or less by mass,
   Mn: 4.5 to 5.5% by mass,
   N: 0.001 to 0.02% by mass,
   Si: 0.70% or less by mass,
   Mg: 0.0010% or less by mass,
   Al: 0.50% or less by mass,
   Ti: 0.50% or less by mass,
   Mo: 0.50% or less by mass,
   Cu: 0.50% or less by mass, and
   Ni and incidental impurities;
   wherein contents of B and Zr in the core wire are controlled to be 0.0010% or less by mass and 0.0010% or less by mass, respectively; and
   contents of Co, P, and S in the incidental impurities are controlled to be 0.10% or less by mass, excluding zero, 0.015% or less by mass, and 0.015% or less by mass, respectively,
   the covering material contains, as the component of a flux, a slag-forming agent: 3.5 to 6.5% by mass, a metal fluoride (in terms of F content): 2 to 5% by mass, and a carbonate (in terms of $CO_2$ content): 2.5 to 6.5% by mass relative to the total mass of the covered electrode; a Mn content in the flux is controlled to be 2.0% or less by mass; a total content of Nb and Ta in the flux is controlled to be 1.5% or less by mass; and a Fe content in the flux is controlled to be 2.5% or less by mass.

2. A Ni-base alloy covered electrode according to claim 1, comprising a core wire composed of a Ni-base alloy and a covering material that contains a component of a flux and covers a periphery of the core wire,
   wherein the core wire contains, relative to the total mass of the core wire,
   Mn: 4.5 to 5.0% by mass.

3. A Ni-base alloy covered electrode according to claim 1, comprising a core wire composed of a Ni-base alloy and a covering material that contains a component of a flux and covers a periphery of the core wire,
   wherein the core wire contains, relative to the total mass of the core wire,
   Mn: 4.60 to 5.18% by mass.

4. A Ni-base alloy covered electrode according to claim 3, comprising a core wire composed of a Ni-base alloy and a covering material that contains a component of a flux and covers a periphery of the core wire,
   wherein the core wire contains, relative to the total mass of the core wire,
   Nb+Ta: 1.1 to 2.0% by mass.

5. A Ni-base alloy covered electrode according to claim 2, comprising a core wire composed of a Ni-base alloy and a covering material that contains a component of a flux and covers a periphery of the core wire,
    wherein the core wire has superior cracking resistance compared to the cracking resistance of the same Ni-base alloy having a Mn content of less than 4.5% by mass.

* * * * *